United States Patent
Whyte et al.

(10) Patent No.: US 7,236,227 B2
(45) Date of Patent: Jun. 26, 2007

(54) SYSTEM FOR MANAGEMENT OF BOTH PRE-SHOW AND FEATURE PRESENTATION CONTENT WITHIN A THEATRE

(75) Inventors: Anthony Whyte, Webster, NY (US); David S. Jones, Fairport, NY (US); Jeffrey S. Loewenguth, Webster, NY (US); Leslie G. Moore, Webster, NY (US); Paul Tomblin, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 175 days.

(21) Appl. No.: 10/972,183

(22) Filed: Oct. 22, 2004

(65) Prior Publication Data

US 2005/0055712 A1 Mar. 10, 2005

Related U.S. Application Data

(63) Continuation-in-part of application No. 10/309,867, filed on Dec. 4, 2002, now Pat. No. 6,812,994.

(51) Int. Cl.
G03B 27/52 (2006.01)
H04N 7/18 (2006.01)

(52) U.S. Cl. .......................................... 352/40; 725/74

(58) Field of Classification Search ................ 352/38, 352/40, 41, 91 R, 123; 725/74, 84, 86, 93, 725/116

See application file for complete search history.

(56) References Cited

U.S. PATENT DOCUMENTS

| | | | |
|---|---|---|---|
| 5,420,978 A | 5/1995 | Tozawa et al. | 395/161 |
| 6,038,367 A * | 3/2000 | Abecassis | 386/46 |
| 6,700,640 B2 | 3/2004 | Morley et al. | 352/40 |
| 6,812,994 B2 * | 11/2004 | Bubie et al. | 352/40 |
| 2002/0056081 A1 | 5/2002 | Morley et al. | 725/1 |
| 2002/0069107 A1 | 6/2002 | Werner | 705/14 |
| 2002/0122155 A1 | 9/2002 | Morley et al. | 352/40 |

(Continued)

FOREIGN PATENT DOCUMENTS

EP 0 306 965 9/1988

(Continued)

OTHER PUBLICATIONS

"Making Digital Cinema Actually Happen—What it Takes and Who's Going to Do It" by Steven A. Morley. *Proceedings of the SMPTE Technical Conference*, XX, XX, No. 140th, Oct. 31, 1998, pp. 1-17, XP-002959780, pp. 10-15.

(Continued)

*Primary Examiner*—Rodney Fuller
(74) *Attorney, Agent, or Firm*—Stephen H. Shaw

(57) ABSTRACT

A method for enabling seamless transitions for a cinema presentation package, wherein the cinema presentation package includes pre-shows, trailers, live events, and main features, the steps include determining the requirements of specific protocols corresponding to the cinema presentation that will affect transitioning between the pre-shows, trailers, live events, and main features. Transition behaviors have to be identified between the pre-shows, trailers, live events, and main features that form the cinema presentation package. Flexibility exists in displaying the cinema presentation package, and yet the pre-shows, trailers, live events, and main features are displayed according to the specific protocols and transition rules associated with the specific protocols.

4 Claims, 3 Drawing Sheets

U.S. PATENT DOCUMENTS

2003/0048418 A1* 3/2003 Hose et al. ................. 352/123
2004/0078268 A1* 4/2004 Sprogis ....................... 705/14
2004/0181807 A1 9/2004 Theiste et al.
2004/0216163 A1 10/2004 Whitcomb

FOREIGN PATENT DOCUMENTS

EP          1 103 845 A1    5/2001
WO         WO 01/13301 A2   2/2001

OTHER PUBLICATIONS

U.S. Appl. No. 10/309,867, filed Dec. 4, 2002, Walter C. Bubie et al.

* cited by examiner

SYSTEM FOR MANAGEMENT OF BOTH PRE-SHOW AND FEATURE PRESENTATION CONTENT WITHIN A THEATRE

CROSS-REFERENCE TO RELATED APPLICATION(S)

This is a continuation-in-part of application Ser. No. 10/309,867, filed on 4 Dec. 2002 now U.S. Pat. No. 6,812,994, entitled "Streamlined Methods and Systems for Scheduling and Handling Digital Cinema Content in a Multi-Theatre Environment", filed in the names of Walter C. Bubie, Curtis R. Cates, David S. Jones, Paul Tomblin, Michael E. McCrackan, and William A. Orfitelli.

FIELD OF THE INVENTION

This invention is related to the field of digital cinema, and more particularly to the use of digitized advertising information in mixed film projection and digital projection multi-theater environments.

BACKGROUND OF THE INVENTION

Today's theater management systems are structured for film projection. Key elements of the systems include a ticketing system, a film projector, a slide projector, a sound system and a theater automation system for semi-automatically controlling basic theater functions such as lighting and audio.

A typical show is divided into two major time segments, pre-show slides used for advertisements, trivia, and facility announcements, and the actual show time composed of show trailers and the feature film.

The exhibitor sells pre-show time to screen advertisers. The screen advertiser then forms advertising contracts with its clients. Contractual conditions include the number of times an advertisement must play, what kind of feature film the advertisement will play with, how long the advertisement will be, and what the start and end engagement dates will be.

With today's slide projector advertising systems these conditions are laborious to fulfill, and are at best based on trust relationships that cannot be easily verified or repudiated by the advertiser. These systems therefore do not leave the advertiser much room for process, product, or profit improvement. What advertisers require are flexible systems that give them control of pre-show advertising content creation, distribution and projection. What exhibitors require are systems that minimize their need to support the advertising portion of the show and do not negatively impact their current feature film workflow and practices.

The show time is used to present trailers and feature films. The theater owner rents films from the originating studios under a set of terms and conditions. These terms include the financial arrangements between the two parties, and the start and end engagement dates. The theater owner does exercise some freedom in terms of executing the schedule on a day-to-day basis during this time. The scheduling is completed weekly, but in some cases the schedule is updated on short notice to accommodate customer response.

The schedule is entered into a point of sale ticketing system that drives a display of the schedule, manages ticket sales and printing, and reports financials associated with the sales. Playback execution of this schedule is effectively independent of that data entry. It is rather a projectionist's interpretation of the schedule and subsequent physical setup of advertising slides on slide projectors, and splicing of advertisement, trailer and feature film content reels on specific instances of projection equipment that are the manifestation of the schedule. Again, a laborious process that can benefit significantly from digital management systems.

Such systems and methods for presentation of digitized content in a cinema environment have been disclosed. U.S. Patent Application No. 2003/0048418 entitled "Presentation Scheduling in Digital Cinema System" presents a system that supports scheduling of digitized content in a purely digital cinema system. It recognizes the need for interfacing with existing theater automation subsystems for environment control but does not adequately address issues with "transitional" digital cinema; "transitional" meaning a system that is comprised of both film projection and digital projection subsystems and incorporates methods and mechanisms that permit cooperation of the two. Similarly, U.S. Pat. No. 6,700,640 B2, entitled "Apparatus and Method For Cueing a Theater Automation System", describes a solution for building digital "platters" comprised of trailers and feature film content with sensitivity to attributes such as display aspect ratio, sound track format, and Motion Picture Association of America (MPAA) ratings. Again, this is discussed in the context of pure digital cinema where presenting alerts to a user at schedule creation time enforces the compatibility of content. This contrasts the algorithm-driven schedule assessment to be described here, which encompasses both hybrid systems utilizing a combination of film projection and digital projection systems and/or combination systems meeting the unique needs of pre-show in combination with show time. Lastly, WO 01/13301 entitled "System and Method For Digitally Providing and Displaying Advertisement Information To Cinemas and Theaters" discusses a just-in-time advertising model. In this invention, content providers submit new content data instances to an algorithmic "carousel" which may not guarantee playback. While this may suit some advertising situations it is not a widespread practice and still requires operator support at the exhibition facility. What is required by advertisers and exhibitors are systems that at a minimum give them the control to manage their respective portions of the show time with no additional workflow and more ideally add new efficiencies to their existing workflow. A void therefore remains in the prior art.

SUMMARY OF THE INVENTION

The present invention is directed to overcoming one or more of the problems set forth above. Briefly summarized, according to one aspect of the present invention, is a method for enabling seamless transitions for a cinema presentation package, wherein the cinema presentation package includes pre-shows, trailers, live events, and main features. The steps include determining the requirements of specific protocols corresponding to the cinema presentation that will affect transitioning between the pre-shows, trailers, live events, and main features. Transition behaviors have to be identified between the pre-shows, trailers, live events, and main features that form the cinema presentation package. Flexibility exists in displaying the cinema presentation package, and yet the pre-shows, trailers, live events, and main features are displayed according to the specific protocols and transition rules associated with the specific protocols.

Another aspect of the present invention provides a system for enabling seamless transitions for a cinema presentation package, wherein the cinema presentation package includes pre-shows, trailers, live events, and main features, that include predetermined specific protocols for governing transitions between the pre-shows, trailers, live events, and main features. Also included are means for organizing scheduling of the pre-shows, trailers, live events, and main features; and flexibility. The present invention enables starting and ending an individual pre-show, trailer, live event, or main feature in a seamless fashion.

A third aspect of the present invention provides a method for scheduling and presenting digital advertising content to an audience at an exhibitor site, the method that includes reading a relational database that contains records of schedule items. Additional reading steps include reading a relational database that contains records of advertising play lists; reading a relational database that contains rules of association; and creating relational database records that associate schedule items in said database with advertising play lists in said database per association rules in said database.

ADVANTAGEOUS EFFECT OF THE INVENTION

Enables the screen advertiser to manage and control the pre-show experience.
Enables the theatre owner to manage and control the showtime experience.
Seamlessly manages the transition and hand off in control between the pre-show and showtime period of the theatre experience.
Enables cooperation with the theatre's ticketing system.
Enables scheduling pre-show based on feature attributes.
Enables scheduling pre-show based on theatre attributes.
Enables avoidance of dark time on screens between pre-show and feature (transition).
Enables flexible inter-show scheduling.
Enables scheduling and playback for any digital display device such as lobby displays.
Enables scheduling pre-show based on presumed time-of-day populations (time slices).
Enables theatre owner to fully control the showtime portion of the theatre experience including show time, and house within the theatre complex.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

This invention acknowledges that void and presents a system that supports the co-existence of film and digital projection subsystems and the coexistence of digital pre-show and showtime systems by automating the reading of exhibitor schedule data and linking advertising content with feature film or digital showtime content via an intelligent, configurable algorithm.

Figure 1:
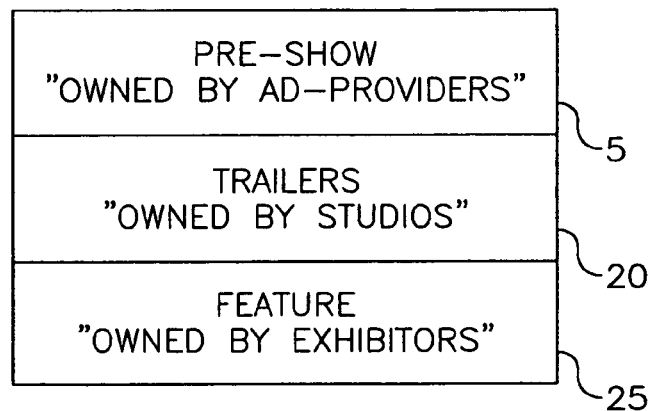
FIG. 1 illustrates the segmentation of theater show periods and ownership in the context of a feature presentation.
Figure 2:
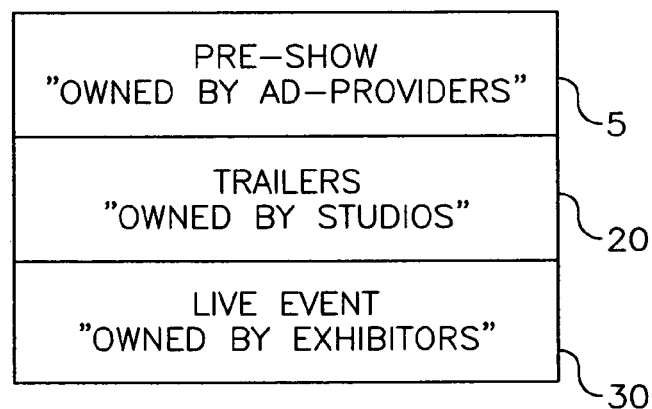
FIG. 2 illustrates the segmentation of theater show periods and ownership in the context of a live event alternative presentation.
Figure 4:
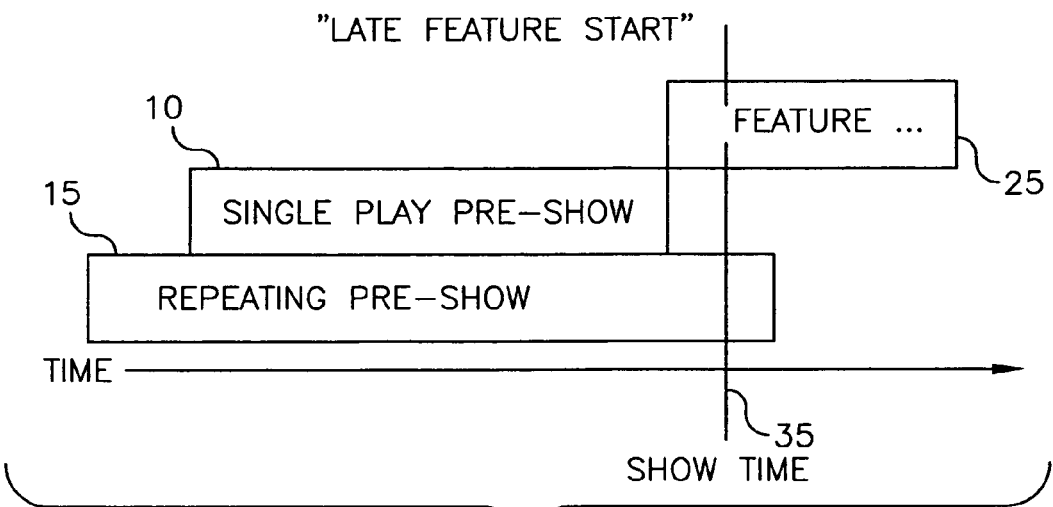
FIG. 4 describes the hierarchical relationships and scheduling flexibilities among repeating, single-play, transition playlists and feature presentation time with a late feature presentation start time.
Figure 5:
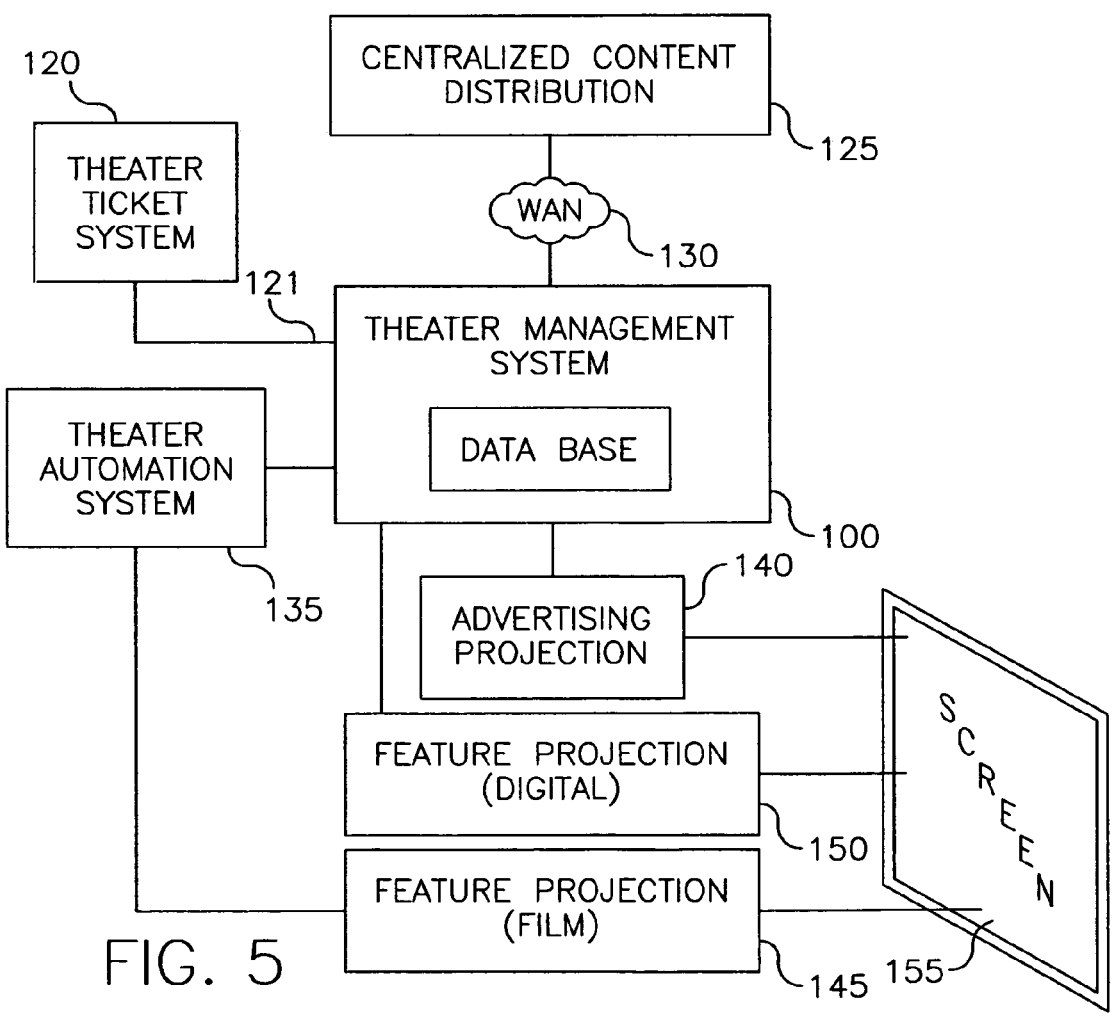
FIG. 5 illustrates system components and their connectivity.

The invention recognizes the unique ownership and business interests of theater advertising providers, studios, and exhibitors and proposes the segmentation of what has been referred to as a theater "showlist". Referring to FIG. 1, we see the showlist as a timewise contiguous sequence of blocks representing time in a theater schedule. The showlist comprises a first segment of digitized pre-show content 5 often taking the form of advertising or informational announcements. The second segment comprises of studio trailers 20 of upcoming feature presentations and releases. The third segment comprises the feature showing 25 itself, also referred to earlier as the "filmblock". "Ownership" in this context is assigned to that entity that has specific control of a portion of the show in terms of what plays, how it is initiated, how it plays, and how it is terminated. Referring to FIG. 2, we see the alternative of live event showings where the live event 30 replaces the time slot of the film or digital feature. FIGS. 4 and 5 present a hierarchical relationship between the pre-show, trailer, and feature segments of the showlist. The schedule is hierarchical in that higher layers have precedence over the lower. The highest ranking has the right to play at any given time. If the highest-ranking level does not play, perhaps due to equipment failure for example, the next lower level will play. This behavior is essential to the seamless presentation of the showlist. The larger context or system within which the invention operates is previously disclosed in U.S. Ser. No. 10/309,867, entitled "Streamlined Methods and Systems For Scheduling and Handling Digital Cinema Content in a Multi-theater Environment", as is entirely incorporated herein by reference.

Ticketing System Interface

Referring to FIG. 5, we see a physical view of the system which includes both legacy and new system components of a digital cinema system as it would operate in a theater today. Legacy aspects of the invention include a ticketing system input and storage device 120 and its connectivity, and theater automation system 135 integration. New digital cinema system components include a core Theater Management System 100 comprising a computer, database 105 and software with interfacing capabilities to both legacy and new digital components. Of note is the presence of Wide Area Network 130 connectivity, such as the Internet or private managed networks to enable both input and loading of digital content and output of system status and historical data. The source and destination of such data is a centralized content distribution entity 125 and clearinghouse of system data.

Today's theater ticket systems 120 are typically computerized devices capable of supporting data entry and storage of feature show schedules. In particular, the scheduling of the feature or filmblock portion of the show is stored. Once stored, this information can drive various other systems that have the capability to interpret the schedule in its saved form, be it textual or database borne. An embodiment of the invention includes interfacing 121 with industry standard ticket systems via a multiplicity of computer networking techniques such as network file access or network file transfer. When configured to operate with a particular system, the invention is aware of new data entry as well as updated data entry and reacts to this information accordingly. The invention creates a connection statefulness with the ticket system such that expectation of updates at a frequency reflective of normal weekly theater operations can be ensured.

Lastly, FIG. 5 shows the coexistence of a projection equipment suite that can be used to drive the seamless showlist presentation on a single screen 155. This equipment comprises existing legacy feature film projection 145, new digital feature projection 150, and new digital advertising projection equipment 145.

Association

As depicted in FIG. 5, the data from the ticket system 120 will be used primarily to drive "associations" or "schedule linkages" between digitized advertising content and feature presentation schedule entries. These entries originate through human interaction with the ticket system and are thus subject to inaccuracies and stylistic variations based on different individuals who interact with the ticket system or different exhibitor methods and best practices. To respond to these variations, an embodiment of the invention includes a textual analysis of data entry that results in either of two "resolution" paths. The first path involves comparison with existing data stores and applies word and language pattern matching resulting in a successful association or a need to construct a request for further handing by a local system operator or a centralized distribution 125 system entity, such as that which loaded the advertising content onto the system. The invention then receives and stores the result of that intervention, thus avoiding the need for future resolution intervention.

Once saved, the association between advertising content and feature presentation content can be applied based on any attribute or combination of attributes of the feature presentations themselves, the facility characteristics, or time. Embodiments of the invention include association based on feature MPAA rating, genre, originator, screen or playback time. It should be realized that, once in place, the invention could be extended to apply to any arbitrary attribute or combination of attributes.

A set of precedence rules (rules that specify what association rules take precedence over others) is programmatically applied by the Theater Management System 100. An algorithm will look for a playlist that is matched to a specific feature title and, if no match is found, then it could look for a match to the feature's genre, and, if still no match is found, continue looking for rating, studio schedule time of day, or screen number. As a fall-through, the invention can assign a default playlist to avoid a dark "advertising" screen.

Playback Behaviors

Figure 6:
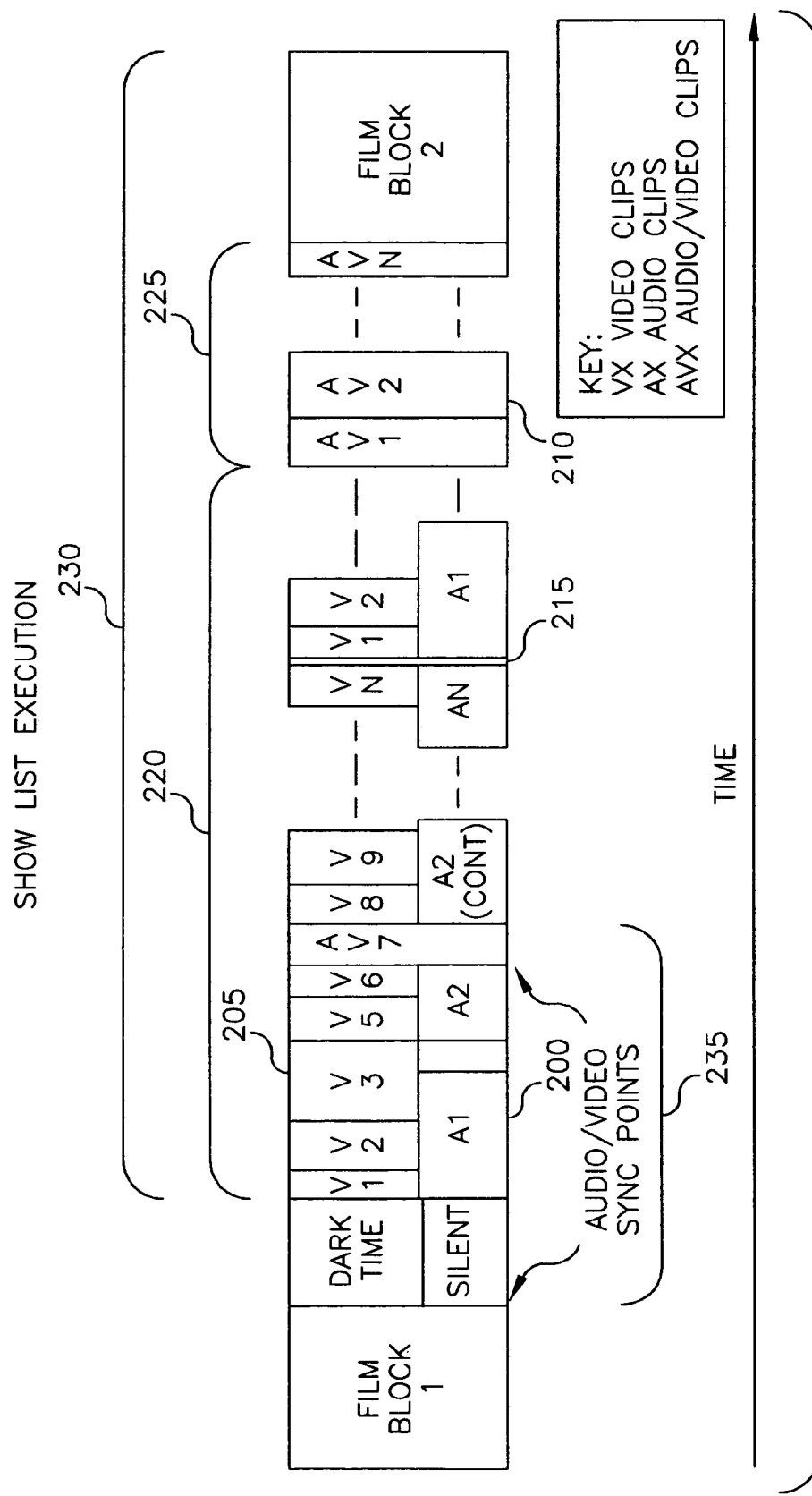
FIG. 6 illustrates details around the structure of repeating and single-play playlists and their required segmentation to support seamless audio and video synchronization.

With the feature schedule data in place and the digitized pre-show content loaded on the system, a notion of an entire "showlist" forms. Referring to FIG. 6, this showlist begins playback at configurable milestones prior to the feature showing. Advertising pre-show will typically begin with repeating-play 220 content. FIG. 6 shows show the time-wise sequencing of pre-show and feature presentation portions of the showlist 230. Repeating play 220 content will continue to loop until it meets schedule-wise with a single play 225 portion of the pre-show. The invention allows for a variable amount of repeating playlist 220 playback based on what can be a varying quantity of single play 225 playlist content. This is illustrated by the time-wise overlapping of these sections, as seen in FIGS. 3 and 4.

What is achieved here is a flexible and seamless transition between repeating and single play pre-show segments. It thusly allows for a single repeating playlist 220 to play with any or all of the single play playlists 225 in the system or, the inverse, where a single, single play 225 playlist can play with any repeating playlist 220 in the system.

Figure 3:
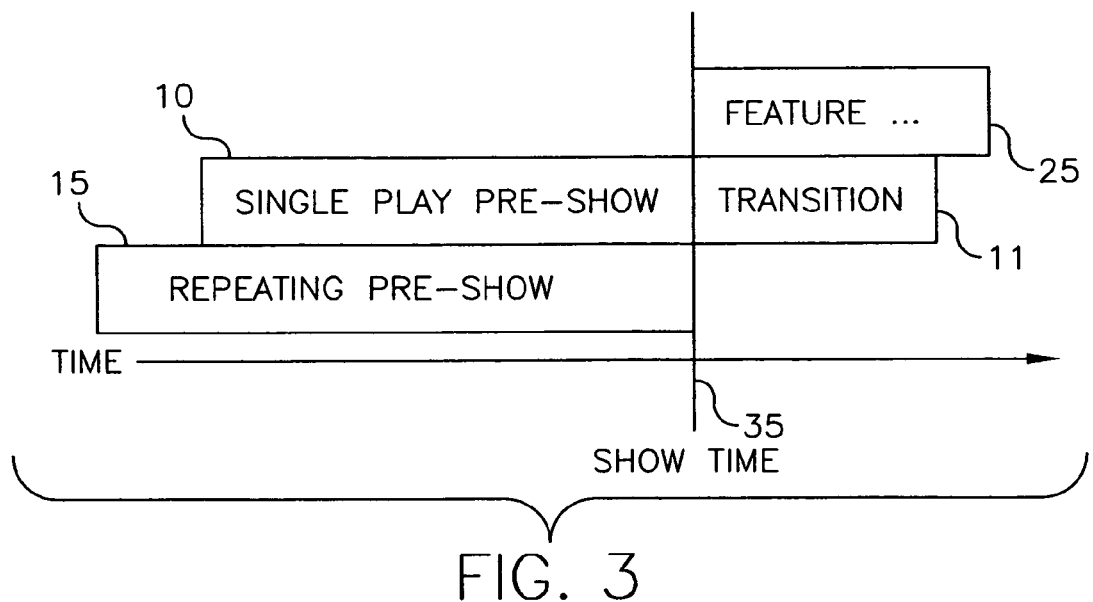
FIG. 3 describes the hierarchical relationships and scheduling flexibilities among repeating, single-play, transition playlists and feature presentation time.

As mentioned and portrayed in FIGS. 3 and 4, schedule execution of feature playback is inexact and reflects up the second decisions which are made based on criteria that are not known nor available to the pre-show portion of the system. Note the differing showtime 35 milestones of FIGS. 3 and 4. To react to this, the invention includes the notion of a "transition" playlist 11 that allows for late execution of the feature playback while maintaining uninterrupted playback of advertising content. In the absence of "transition" 11 content, one embodiment of the invention begins playback of the repeating playlist 15 portion of the pre-show. The notion of such a playlist allows ad providers to designate premium content to this slot which is proximate to feature playback and therefore represents a highly desirable playback time.

Another manifestation of unreliable schedule execution involves early feature playback. Conversely, the invention includes an interface with well-known theater automation systems 135, as depicted in FIG. 6, that allow for communication between pre-show and feature playback equipment. The result is when feature projection systems start projection, pre-show projection systems stop projection.

Lastly, another embodiment of the invention allows for configuration whereby the end of the pre-show playlists can be used to signal the beginning of feature playblack without the need for operator intervention. This too is communicated via a theater automation system 135 interface.

Audio Multiplexing

Referring to FIG. 6, the invention allows construction of repeating playlists which can include elementary streams consisting of either audio 200 or video 205 components or so-called program streams 210 consisting of both audio and video components. The implication with "audio only" 200 streams is such that they will play as "background audio" against the "video only" 205 streams yet intelligently relinquish to "program stream" 210 audio when encountered. To achieve this, an embodiment of the invention includes the formation of "segments" 235 within which advertising providers can specifically control the playout of specific audio and video components by designating specific streams as "background audio", "video only" or "audio/video" sources.

The invention provides a solution that allows pre-show and showtime, film and/or digital projection systems to cooperate in a theater management environment. By integrating with a theater's pre-existent scheduling system, and automation system advertising content is scheduled to play with all feature films per advertiser prescribed rules.

Each item in the schedule can be referred to as a "showlist". Showlists comprise playlists, which comprise segments, which comprise elementary (audio or video) and program (both audio and video) streams. A showlist is composed of features and associated playlists. The feature is the nucleus of the showlist.

There are two types of playlist: single-play, and repeating. Single-play playlists are scheduled to start at certain times and play once through, at most. Repeating playlists are scheduled to start at a certain time, with their content playing, repeatedly, if necessary, until a scheduled end time.

Playlists are placed relative to the feature in the showlists with the functions of pre-show, post-show, and transition. Transition playlists are shown only as fill between regularly scheduled playlists and features that do not start or end on time.

The exhibitor performs feature film schedule data entry via the schedule system computer program. This system saves the schedule in a database, or file-based form accessible by other computer systems. With this information, printouts of the schedule are attached to each projector and are referred to by the projectionist to determine how and when feature film projection equipment is to be operated.

Advertising content playlists and their association rules are received by the system via electronic network and media distribution means. The playlists and their rules are interpreted and saved in a database program. Each day, content that is needed to fulfill the screens' daily schedule is copied to a computer system that drives the digital projection system for that screen. As a scheduled feature playback time approaches repeatable and single play playlists associated with that feature will begin to play subject to the computer system receiving signals from the film projection system (via theater automation system) that feature film playback has begun. At this point digital advertising playback is terminated.

Schedule execution at the exhibitor is by nature inexact due to the fact that it is a projectionist's action that is often the triggering mechanism to start a feature film showing. If the time is reached where feature film playback has not started per the ticket system schedule, a digital transitional playlist will be played and projected.

Schedule execution at the exhibitor is by nature inexact. This is due to a lack of absolute time synchronization between the schedule system and digital advertising system along with the fact that it is a projectionist's action that is often the triggering mechanism to start a feature film showing, or to conscious decisions at exhibition to delay the show start time. In order to accommodate this an aspect of the invention is an interface with the theater's automation system that interprets automation signals in the context of the theater schedule.

The exhibitor performs feature film schedule data entry via the schedule system computer program. This system saves the schedule in a database, or file based form accessible by other computer systems. The showtime schedule can be automatically utilized for initiating the showing of a film or digital showtime feature. It is common for shows to be delayed despite automatically scheduling the start time due to long ticket lines, for example. If the time is reached where feature film playback has not started per the ticket system schedule—delayed due to manual intervention at the theatre—a digital transitional playlist will be played and projected.

It is one aspect of this invention to provide a system which automatically controls the pre-show as per the contract with the screen advertiser while allowing the exhibitor to control the showing of the show time feature—and managing the transition and hand off in control between the two aspects of the theatre experience.

The schedule therefore drives the start of pre-show repeating and single-play playlists followed by an optional transitional playlist if the feature is not started on time. Another aspect of the invention includes a response to an interruption in digital feature or film projection that will begin digital projection of a transitional playlist. And finally, another aspect of the invention is a configurable response to the end of film projection that begins digital playback of a repeating playlist.

The invention has been described with reference to a preferred embodiment. However, it will be appreciated that variations and modifications can be effected by a person of ordinary skill in the art without departing from the scope of the invention.

PARTS LIST

5 Pre-show showlist section
10 Single play playlist
11 Transition playlist
15 Repeating playlist Pre-show showlist section
20 Trailer showlist section
25 Feature showlist section
30 Live Event showlist section
35 Feature start time line
100 Theater Management Server
105 Theater Management Server—Database
110 Association Engine
115 Screen Content Player
120 Theater Ticket System
121 Theater Ticket System Connectivity
125 Centralized Content Distribution Server
130 Wide Area Network Connectivity
135 Theater Automation System
140 Advertising Projector
145 Feature Projector—Film Projection
150 Feature Projector—Digital Projection
155 Cinema Screen
200 Showlist audio only content
205 Showlist video only content
210 Showlist audio/video content
215 Playlist Repeat Point
220 Repeating playlist
225 Single Play playlist
230 Showlist
235 Segments

What is claimed is:

1. A method for enabling seamless transitions for a cinema presentation package, wherein the cinema presentation package includes pre-shows, trailers, live events, and main features, the steps comprising:
   (a) determining cinema presentation protocols that will affect transitioning between the pre-shows, trailers, live events, and main features;
   (b) identifying playlist rotations for transitioning between the pre-shows, trailers, live events, and main features that forms the cinema presentation package;
   (c) selectively displaying the cinema presentation package according to the cinema presentation protocols, such that either a transition playlist, or a repeating playlist, or a single play playlist is executed prior to the main feature to avoid exhibiting a dark screen having no visual content displayed upon it prior to the main feature; and
   (d) displaying the pre-shows, trailers, live events, and main features according to playlist transition rules associated with the cinema presentation protocols.

2. The method claimed in claim 1, wherein the cinema presentation package is displayed using a film projector, or a digital projector, or a combination of both a digital projector and film projector according to display requirements of the pre-shows, trailers, live events, and main features.

3. The method claimed in claim 1, wherein the cinema presentation protocols are selected from the group consisting of ownership rights, contractual obligations, use models, scheduling requirements, screen selection rights, dynamic content, and time slot rights.

4. A system for enabling seamless transitions for a cinema presentation package, wherein the cinema presentation package includes pre-shows, trailers, live events, and main features, comprising:
   (a) predetermined protocols for governing playlist transitions between the pre-shows, trailers, live events, and main features;
   (b) a means for scheduling the pre-shows, trailers, live events, and main features;
   (c) a means for selecting either a transition playlist, or a repeating playlist, or a single play playlist for execution prior to the main feature; and
   (d) a means for starting and ending an individual pre-show, trailer, live event, or main feature using either the transition playlist, or the repeating playlist, or the single play playlist to avoid exhibiting a dark screen having no visual content displayed upon it prior to the main feature.

* * * * *